Figure 1:
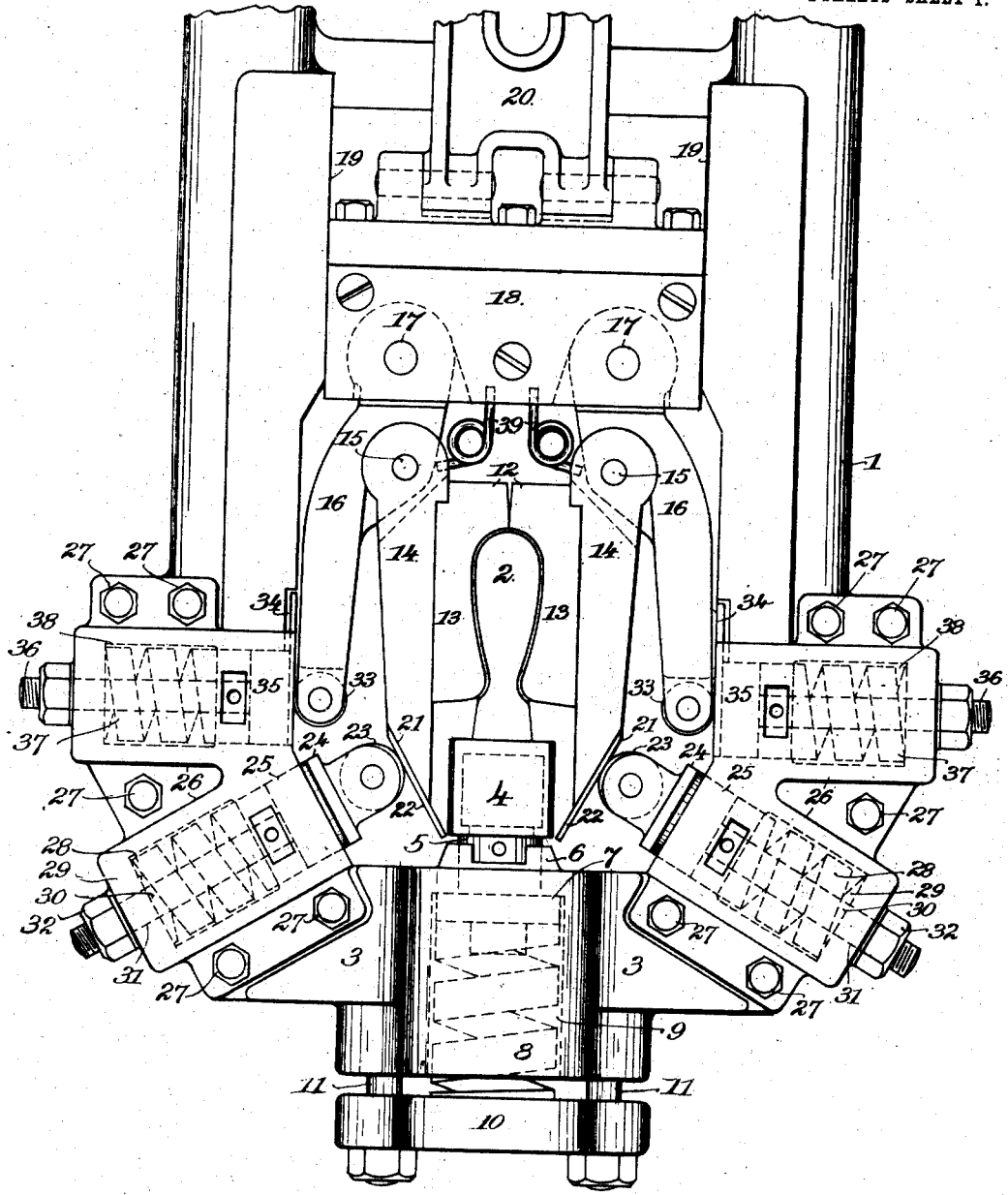

W. J. YOUNG.
COUNTER MOLDING MACHINE.
APPLICATION FILED DEC. 7, 1899.

WITNESSES.

INVENTOR.

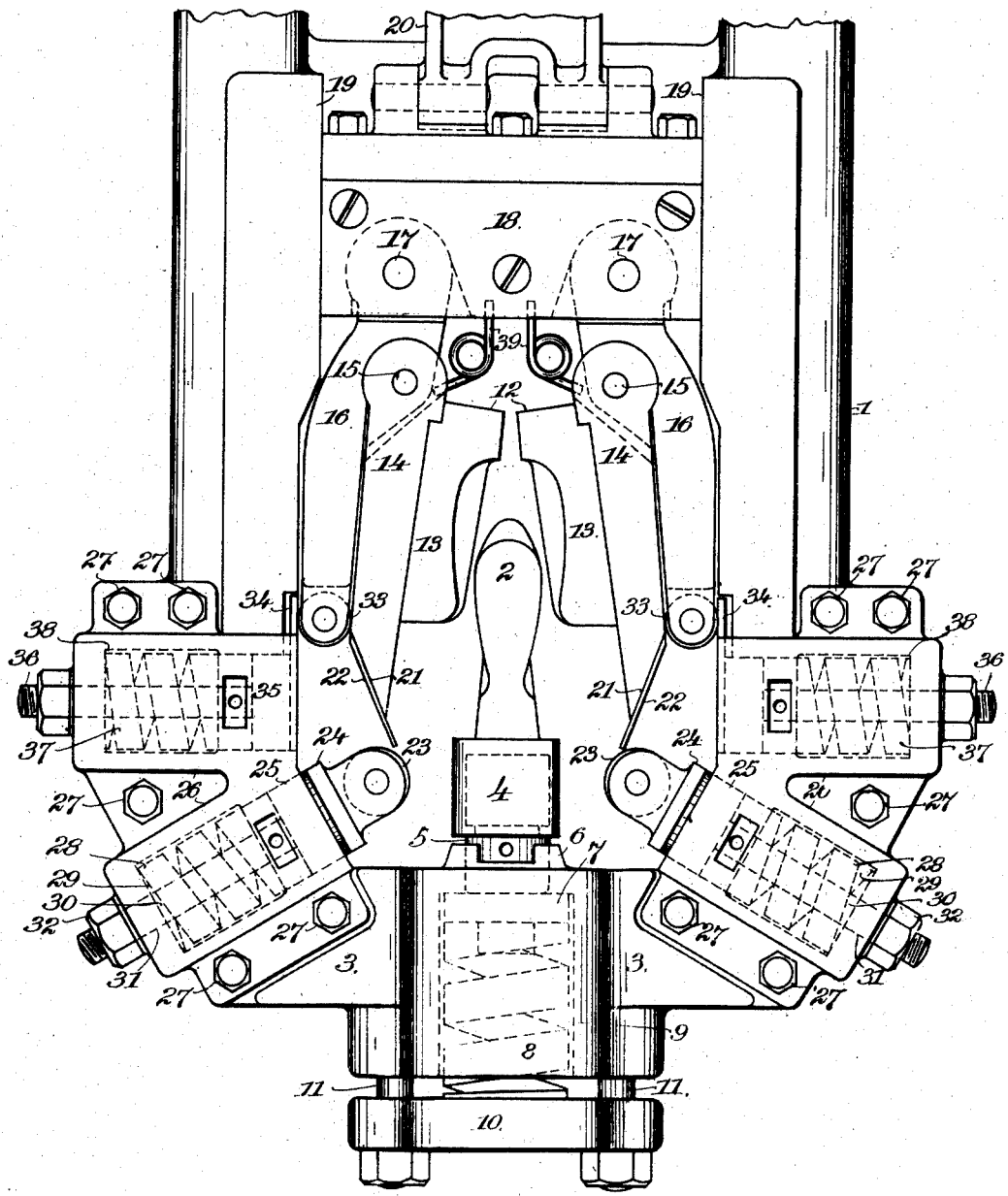

UNITED STATES PATENT OFFICE.

WILLIAM J. YOUNG, OF LYNN, MASSACHUSETTS.

COUNTER-MOLDING MACHINE.

No. 927,204.   Specification of Letters Patent.   Patented July 6, 1909.

Application filed December 7, 1899. Serial No. 739,566.

*To all whom it may concern:*

Be it known that I, WILLIAM J. YOUNG, citizen of the United States, residing at Lynn, in the county of Essex and State of Massachusetts, have invented certain new and useful Improvements in Counter-Molding Machines; and I do hereby declare the following to be a full, clear, and exact description of the invention, such as will enable others skilled in the art to which it appertains to make and use the same.

The present invention relates to machines for manufacturing boot and shoe counters or stiffeners and more particularly to an improved machine for molding or shaping counters, such machines being generally known to the trade as counter molding machines.

The object of the present invention is to produce a counter molding machine of simple form and arrangement in which the counter molding dies or molds shall be so constructed and actuated as to apply uniform molding and shaping pressure over the entire surface of the counter, and whereby the shaping molds shall be automatically adjustable to variations in thickness of the material from which the counters are made.

To the above end the present invention consists of the devices and combinations of devices which will be hereinafter described and claimed.

The present invention is illustrated in the accompanying drawings, in which,

Figure 1 shows in top plan view so much of a counter molding machine as will be necessary to explain the present invention, the molding dies in this view being closed. Fig. 2 shows a similar view with the molding dies open.

Inasmuch as the present invention resides wholly in the form and arrangement of the molding dies it has been deemed unnecessary to show or describe the machine in detail or the means for reciprocating the female mold, all of which can be of any usual or preferred construction, such for example like the machine disclosed in Letters Patent of the United States #519936 granted to me on the 15th day of May, 1894.

The machine comprises a suitable frame which may be of any usual or preferred form or arrangement and which supports the bed 1, said bed being mounted on the frame in an inclined position as shown in the patent referred to, whereby the molds are disposed in convenient position for the operator in removing and inserting the counters.

The male mold 2 may be of any usual or ordinary shape to produce the shape of counter desired, and it is supported in a fixed position upon the base 3 of the bed 1, it being preferably so supported that it may to a certain extent yield under the action of the female mold, and for this purpose it is mounted upon a block 4, the stem 5 of which is arranged to slide in a bearing 6 formed in the base 3. At the lower end of the stem 5 there is supported a washer 7 which rests upon the inner end of a strong coiled spring 8 which is located in a chamber 9 formed in the base 3, the outer end of the spring 8 being supported by an adjusting plate 10 which is held to the base 3 by means of adjusting bolts 11, the arrangement being such that the tension of the spring 8 may be adjusted by moving in or out the plate 10.

It will be noted that by the construction just described the male mold 2 is capable of having a slight downward yielding motion when acted upon by the female mold. The female mold 12 is of that type known as a sectional or divided mold, and comprises members 13, each of which is formed with a molding face corresponding in contour to one half of the molding face of the male molds 2. Each of the sections 13 is supported by an arm 14 which is pivotally connected at 15 to levers 16, the levers 16 being pivoted at 17, to the sliding block or head 18 which is arranged to be reciprocated along a suitable guide way 19 formed on the inner faces of the sides of the bed 1, it being moved along the guide way by any suitable mechanism, as by means of toggle levers as shown in the patent hereinbefore referred to, a portion of one member 20 of the toggle levers being shown in the drawings.

The above arrangement is such that a movement of the block 18 along the guide way 19 will impart to the divided mold 12 a movement toward and from the male mold 2 as will be clear from an inspection of the drawings. It is designed that as the divided mold 12 moves downward toward the male mold 2 that said mold shall be closed in order to impart the necessary molding pressure to the counter, and for this purpose the lower ends of the arms 14 which carry the sections 13 of the divided mold are beveled as shown at 21 and preferably provided with hard steel plates 22 which preferably extend some distance beyond the lower ends of the arms 14, and these beveled ends, or the plates 22 secured thereto, are arranged to engage rollers 23 carried by heads 24 supported to slide in bearings 25 formed in the casings 26 secured by bolts 27 to the bed 1. The heads 24 rest upon coiled springs 28 which are received in chambers 29 formed in the casings 26 and they are provided with rods 30 which pass through openings 31 in the ends of the chambers, and the outer ends thereof are threaded to receive the adjusting stop nuts 32, which nuts engage the outer surfaces of the casings 26 and limit the inward movement of the heads 24, at the same time permitting the adjustment of the tension of the springs 28.

It will be noted that upon a downward movement of the block 18, the plates 22 of the arms 14 will contact with the rollers 23 supported by the heads 24, and that the continued downward movement will cause the arms 14 to swing about their fulcrums 15 to apply molding pressure along the sides of the counter, which pressure will be increased as the downward movement of the block 18 continues.

The lower end of the levers 16 carry rollers 33 which are arranged to engage plates 34 carried by the inner ends of heads 35 mounted upon rods 36 and backed up by springs 37 received in the chambers 38 of the casings 26, the arrangement being substantially the same as that of the spring supported heads 24 heretofore described.

It will be noted that after the back of the divided mold 12 engages the counter at the back of the mold 2, that the continued downward movement of the divided mold thereafter, has a tendency to cause the beveled ends of the arms 14 to swing farther inward greatly increasing the pressure exerted on the counter.

For the purpose of spreading the sections of the divided mold as it is retracted there are provided suitable coiled springs 39, the upper ends of which are secured in the block 18, and the other ends to the swinging arms 14, so arranged that when the block or head 18 is retracted the springs 39 act to spread the arms 14 and to open the divided mold.

It will be noted that by supporting the male mold in such manner that it may yield slightly in a longitudinal direction or in the direction of travel of the female mold, provision is made for the further movement of the female mold after it shall have closed around the counter on the male mold, such further downward movement causing the pivoted ends of the arms 14 to still further move inward the members of the divided mold to increase the pressure exerted on the counter, which pressure by reason of the compound pivotal action of the arms 14 and the levers 16 will be substantially uniform along the entire surface of the counter.

Having described the construction and mode of operation of my invention I claim as new and desire to secure by Letters Patent of the United States:—

1. A counter molding machine, having, in combination, a male mold, a divided female mold, arms carrying the members of the female mold and pivoted upon yielding supports, and yielding means for swinging said arms upon their pivotal supports to close the female mold, substantially as described.

2. A counter molding machine, having, in combination, a male mold, a divided female mold, pivoted arms supporting the members of the female mold, pivoted levers supporting the arms, and means for actuating the levers and arms to close the female mold to compress the blank, substantially as described.

3. A counter molding machine, having, in combination, a male mold, a divided female mold, pivoted arms for closing the members of the female mold to compress the blank, pivoted levers connected with and actuating the arms and a reciprocating cross-head connected with and actuating the pivoted levers, substantially as described.

4. A counter molding machine, having, in combination, a male mold, a divided female mold, a reciprocating cross-head, a pair of levers pivoted to the cross-head, a pair of arms pivoted to the levers, and supporting the members of the divided female mold, and yielding heads arranged to engage the free ends of the levers and arms, substantially as described.

In testimony whereof I affix my signature, in presence of two witnesses.

WILLIAM J. YOUNG.

Witnesses:
   T. HART ANDERSON,
   A. E. WHITE.